US010908624B2

(12) United States Patent
Marotta et al.

(10) Patent No.: US 10,908,624 B2
(45) Date of Patent: Feb. 2, 2021

(54) METHOD FOR MANAGING OVER-TEMPERATURE EXCURSIONS IN A FAILED-FIXED CONTROL SYSTEM

(71) Applicant: Hamilton Sundstrand Corporation, Charlotte, NC (US)

(72) Inventors: Edward John Marotta, Longmeadow, MA (US); Geoffrey T. Blackwell, Vernon, CT (US); James A. Gosse, Storrs, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 85 days.

(21) Appl. No.: 16/186,318

(22) Filed: Nov. 9, 2018

(65) Prior Publication Data

US 2020/0150699 A1 May 14, 2020

(51) Int. Cl.
*G05D 23/19* (2006.01)
*B64D 33/00* (2006.01)
(52) U.S. Cl.
CPC ............. *G05D 23/19* (2013.01); *B64D 33/00* (2013.01)
(58) Field of Classification Search
CPC ................................ G05D 23/19; B64D 33/00
See application file for complete search history.

(56) References Cited

U.S. PATENT DOCUMENTS

| 4,835,654 A | 5/1989 | Riley | |
|---|---|---|---|
| 6,222,349 B1 | 4/2001 | LeRow et al. | |
| 6,334,502 B1 * | 1/2002 | Tsujimoto | B62D 5/065 180/446 |
| 6,457,466 B1 * | 10/2002 | Ritter | F01N 3/02 123/198 D |
| 6,529,815 B2 * | 3/2003 | Hawkins | F02D 41/0007 123/198 D |
| 6,655,326 B2 | 12/2003 | Purcell et al. | |

(Continued)

FOREIGN PATENT DOCUMENTS

JP       2007262901 A       10/2007

OTHER PUBLICATIONS

European Search Report for Application No. 19194735.7, dated Dec. 5, 2019, 8 pages.

*Primary Examiner* — Charles R Kasenge
(74) *Attorney, Agent, or Firm* — Cantor Colburn LLP

(57) ABSTRACT

A method of managing over-temperature excursions in an electronic control unit of a control system having failed-fixed capability and an operationally independent temperature monitoring and power enable function. The method includes receiving a temperature signal indicative of a temperature associated with an electronic control unit, determining if the temperature associated with the electronic control unit exceeds a first selected threshold, determining if the temperature associated with the electronic control unit exceeds a second selected threshold, and ascertaining if an engine associated with the control system is operational. The method also includes that if the engine is not operational and the temperature exceeds the first selected threshold, then disabling an actuator associated with the control system. In addition, the method also includes that if the temperature associated with the electronic control unit exceeds the second selected threshold, then disabling an actuator associated with the control system.

16 Claims, 3 Drawing Sheets

(56) References Cited

U.S. PATENT DOCUMENTS

| | | | |
|---|---|---|---|
| 6,874,358 B2 * | 4/2005 | Wolber | F02D 41/065 374/144 |
| 7,228,221 B2 * | 6/2007 | Niimi | F02D 19/081 123/339.11 |
| 8,160,804 B2 * | 4/2012 | Chominsky | F02D 41/08 701/112 |
| 9,018,804 B2 | 4/2015 | Saladin et al. | |
| 9,124,208 B2 * | 9/2015 | Inamura | H02P 29/028 |
| 10,125,702 B2 * | 11/2018 | Racca | F02D 41/0065 |
| 2010/0030456 A1 * | 2/2010 | Chominsky | F02D 41/08 701/112 |
| 2011/0060482 A1 | 3/2011 | Harrison | |
| 2013/0096794 A1 * | 4/2013 | Febrer | B60K 23/0808 701/69 |
| 2013/0300332 A1 * | 11/2013 | Inamura | H02P 29/028 318/472 |
| 2014/0330471 A1 * | 11/2014 | Ozaki | B60L 50/51 701/22 |
| 2015/0027152 A1 * | 1/2015 | Marco | B60H 1/00885 62/126 |
| 2016/0101776 A1 * | 4/2016 | Hata | B60W 20/40 477/3 |
| 2016/0273433 A1 * | 9/2016 | Yamamoto | F01N 3/2892 |
| 2016/0377022 A1 * | 12/2016 | Tofukuji | F02F 1/10 123/41.82 R |
| 2017/0066435 A1 * | 3/2017 | Morisaki | B60W 20/16 |
| 2018/0149086 A1 | 5/2018 | Moniz et al. | |

\* cited by examiner

METHOD FOR MANAGING OVER-TEMPERATURE EXCURSIONS IN A FAILED-FIXED CONTROL SYSTEM

BACKGROUND

The present disclosure relates aircraft controllers and temperature protections and, in particular, over-temperature protection for controller circuits and components on an aircraft.

Vehicles, such as aircraft, typically utilize one or more electronic control unit(s) (ECU) in various control applications to ensure inflight operation, provide for redundancy, and fail-operational capabilities. A primary function performed by an ECU in an aircraft application is engine control. Controller(s) and their associated components, utilized with engine control are commonly exposed to extreme temperatures and temperature variations. In addition, in some instances, the temperatures can be even more extreme, particularly when cooling may not be available. For example, during soak-back or failure (fire or cooling loss) conditions. Such extreme conditions can cause damage to the controllers and/or impact engine operation. In any vehicle engine system controlled by electronics, the temperature capability of the electronics in the controller is limited. The specifications associated with most electronic components have operational temperature limits of 125° C. at best. Moreover, many are rated or limited to operating temperatures of at 105° C. or below. In engine applications, the operating temperatures can exceed these temperatures and jeopardize safe engine controlling operation.

Overheating is a common cause for the failure of the ECU. This applies particularly to aircraft engine applications, which are required to operate under widely differing ambient conditions but forced cooling maybe halted during engine stop and hot engine soak-back occurs. In many engine shutdown conditions, engine thermal soak-back occurs without engine running, and no forced cooling is provided. During this soak-back condition, an airframe electrical power source may not be disabled, and many electronic systems are still operational. As a result, internal heat dissipation during these conditions, particularly during hot day operation, may degrade component life or lead to more immediate failure. For this reason, it is known to cool the ECU of such an engine by mounting it on a cooling system. Generally, the ECU cooling system has been designed to cope with certain specified extremes of ambient temperature and engine load but if the engine is operated outside the specified operating range then failure of the ECU could occur or even possible damage to the components.

Therefore, it would be desirable to have a method and system that facilitates safe engine operation with electronics controlling an engine in a high temperature environment.

SUMMARY

According to one embodiment, disclosed herein is a method of managing over-temperature excursions in an electronic control unit of a control system having failed-fixed capability and an operationally independent temperature protection function. The method includes receiving a temperature signal indicative of a temperature associated with an electronic control unit, determining that the temperature associated with the electronic control unit exceeds a first selected threshold, determining if the temperature associated with the electronic control unit exceeds a second selected threshold, and ascertaining if an engine associated with the control system is operational. The method also includes that if the engine is not operational and the temperature exceeds the first selected threshold, then disabling an actuator associated with the control system. In addition, the method also includes that if the temperature associated with the electronic control unit exceeds the second selected threshold, then disabling an actuator associated with the control system.

In addition to one or more of the features described above, or as an alternative, further embodiments of the method may include establishing a power source for the temperature monitoring and power enable device independent of a power source for the electronic control unit.

In addition to one or more of the features described above, or as an alternative, further embodiments of the method may include that the power source is a regulator.

In addition to one or more of the features described above, or as an alternative, further embodiments of the method may include receiving another temperature signal indicative of another temperature associated with the electronic control unit.

In addition to one or more of the features described above, or as an alternative, further embodiments of the method may include that the second selected threshold is determined based on the another temperature signal.

In addition to one or more of the features described above, or as an alternative, further embodiments of the method may include that the first selected threshold corresponds to a temperature of the electronic control unit below a maximum operating temperature.

In addition to one or more of the features described above, or as an alternative, further embodiments of the method may include that the first selected threshold is in the range of about 105° C. to 115° C.

In addition to one or more of the features described above, or as an alternative, further embodiments of the method may include that the second selected threshold corresponds to a maximum operating temperature of a component of the electronic control unit.

In addition to one or more of the features described above, or as an alternative, further embodiments of the method may include that the second selected threshold is about 115° C. to 125° C.

In addition to one or more of the features described above, or as an alternative, further embodiments of the method may include that an operating temperature of components associated with the temperature control function exceeds the maximum operating temperature of the electronic control unit.

Also described herein in an embodiment is a system for managing over-temperature excursions in an electronic control unit of a control system having failed-fixed capability. The system includes an electronic control unit associated with the control system, the electronic control unit operable to control a failed-fixed actuator, a temperature sensor configure to provide a temperature signal indicative of a temperature associated with an electronic control unit, and a temperature monitoring and power enable device, operably connected to the electronic control unit, the temperature monitoring and power enable device configured to disable the fail-fixed actuator command to an actuator associated with the control system under selected conditions.

In addition to one or more of the features described above, or as an alternative, further embodiments of the system may include that the temperature monitoring and power enable device is configured to receive a signal indicative of indicative of a temperature associated with an electronic control unit, determine if the temperature associated with the electronic control unit exceeds a first selected threshold, determine if the temperature associated with the electronic control unit exceeds a second selected threshold, and ascertain if an engine associated with the control system is operational. The temperature monitoring and power enable device is also configured to disable a command to an actuator associated with the control system if the engine is not operational and the temperature exceeds the first selected threshold and disable a command to the actuator associated with the control system, if the temperature associated with the electronic control unit exceeds the second selected threshold.

In addition to one or more of the features described above, or as an alternative, further embodiments of the system may include another temperature sensor, the temperature sensor providing another temperature signal indicative of another temperature associated with the electronic control unit.

In addition to one or more of the features described above, or as an alternative, further embodiments of the system may include that the temperature monitoring and power enable device is further configured to determine if the another temperature associated with the electronic control unit exceeds the second threshold based on the another temperature signal.

In addition to one or more of the features described above, or as an alternative, further embodiments of the system may include that the temperature monitoring and power enable device includes a power source for the temperature monitoring and power enable function independent of a power source for the electronic control unit.

In addition to one or more of the features described above, or as an alternative, further embodiments of the system may include that the first selected threshold corresponds to a temperature of the electronic control unit below a maximum operating temperature.

In addition to one or more of the features described above, or as an alternative, further embodiments of the system may include that the first selected threshold is in a range of about 105° C. to 115° C.

In addition to one or more of the features described above, or as an alternative, further embodiments of the system may include that the second selected threshold corresponds to a maximum operating temperature of a component of the electronic control unit.

In addition to one or more of the features described above, or as an alternative, further embodiments of the system may include that the second selected threshold is in a range of about 115° C. to 125° C.

In addition to one or more of the features described above, or as an alternative, further embodiments of the system may include that an operating temperature of components associated with the temperature control device exceeds the maximum operating temperature of the electronic control unit.

In addition to one or more of the features described above, or as an alternative, further embodiments of the system may include ascertaining if a cooling system associated with the control system is operational and disabling a command to an actuator associated with the control system if the cooling system is not operational and the temperature exceeds the first selected threshold.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description.

BRIEF DESCRIPTION OF THE DRAWINGS

The subject matter which is regarded as the disclosure is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
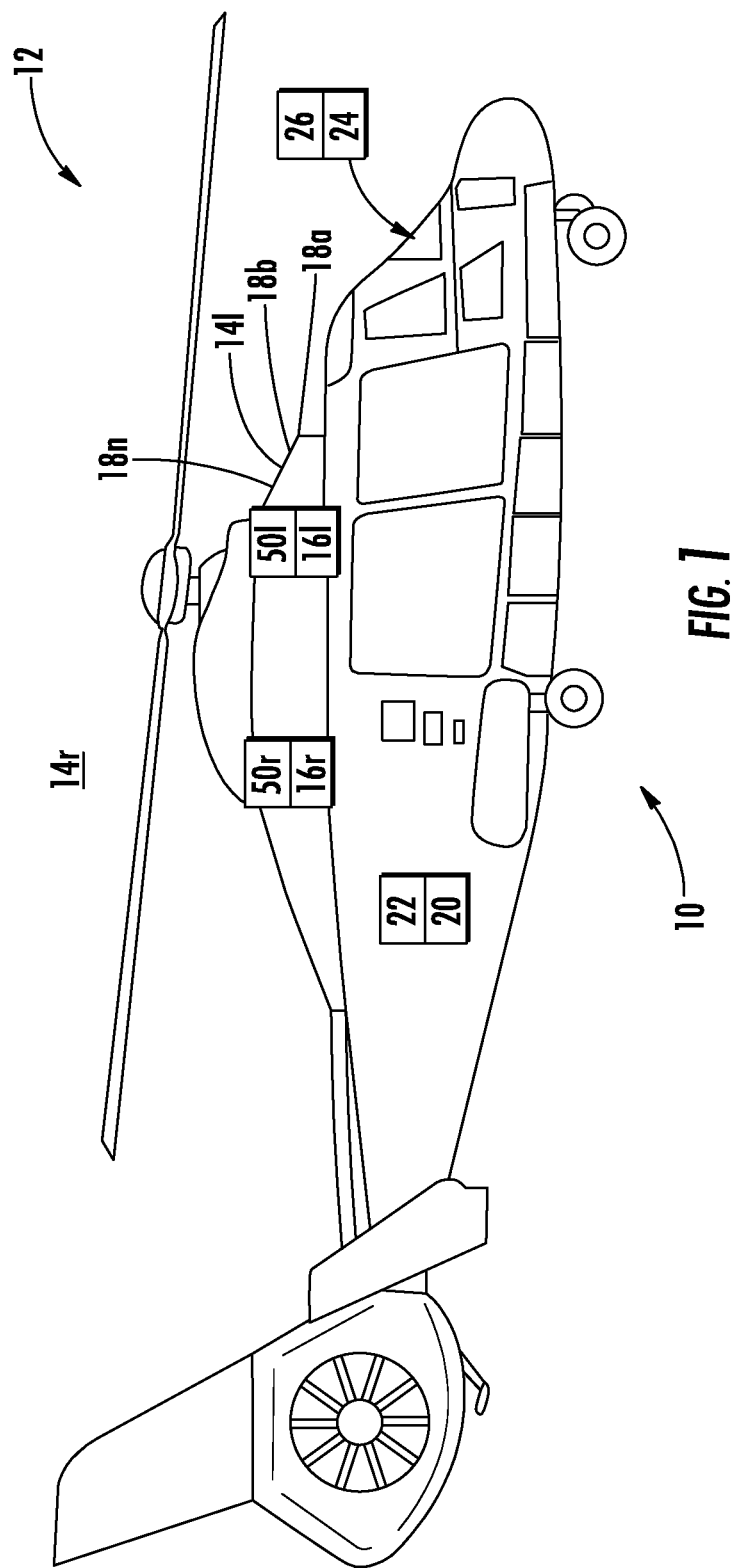
FIG. 1 depicts a simplified diagram of an aircraft with an electrical system including engine controllers in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

In general, embodiments herein relate to an application of a method to autonomously depower selected electrical components to protect the components of an engine controller in a fail-fixed based control system from thermal damage. The system and method may allow for safe engine operation by the electronics controlling an engine in a high temperature environment under selected conditions, such as without cooling. More particularly, the system and method include providing protections for components at temperature extremes to avoid permanent damage.

The described embodiments utilize the discovery that electronic components have specified storage temperatures well above their rated operational temperatures. Most electronic component specifications allow for non-operating storage temperatures of up to 150° C. or higher without damage to the component, while their operating temperature limit is usually considerably lower. Furthermore, the described embodiments are applied to a so-called 'failed-fixed" controller-actuator architecture where the controller components and/or actuator that remain fixed (e.g., immovable) when not commanded (for example, stepper motor, non-back drivable jack screw). In one alternative, the control system can be redundant such that the failure or disablement of a particular controller e.g., ECU, in the control system results in a backup controller and actuator continuing to operate. Furthermore, the control system can be structured such that a failure or disablement of a particular controller in the control system does not require use of electronics (i.e., the particular ECU) being protected. However the described embodiments may also be applied to redundant multichannel ECU designs, such that one controller channel detecting an over-heat threshold can autonomously depower while the $2^{nd}$ may continue to operate if it is not exceeding its thermal limits. For example, systems with either back-up control, including an alternate channel, mechanical backup or fail-safe effector architecture, a 2nd higher thermal limit is assigned that will also depower to protect electronics such that once more benign thermal values return the ECU can autonomously re-assert power and regain operational control.

Referring to FIG. 1, an aircraft 10 is shown. Aircraft 10 includes one or more engine control systems shown generally as 12. The engine control system 12 includes and interconnects with one or more engine controllers 16*l*, 16*r* commonly located at or near each engine 14*l*, 14*r*. In the described embodiments, the reference numerals are annotated with an "l" or "r" to denote the left or right side of the aircraft 10 for the purpose of simplicity of description. Likewise, the annotation "a", "b", . . . "n" is employed to simplify designation of a multiple enumeration of a component or element. Each of the engine controllers 16*r*, 16*l* is configured to operate one or more fail-fixed actuators shown generally as 18, and more specifically as 18*a*, 18*b*, . . . 18*n* to control the operation of the engines 14*r*, 14*l*. The engine control system 12 may be operably connected to various components throughout the aircraft 10, including, but not limited to sensors 20, controllers 22, control panels 24, displays 26, and the like. Temperature extreme protection for the one or more engine controller(s) 16*r*, 16*l* is provided by independent temperature monitoring and power enable circuits denoted as 50*r* and 50*l* respectively, each integral with and connected to respective engine controllers 16*r*, 16*l*.

Figure 2:
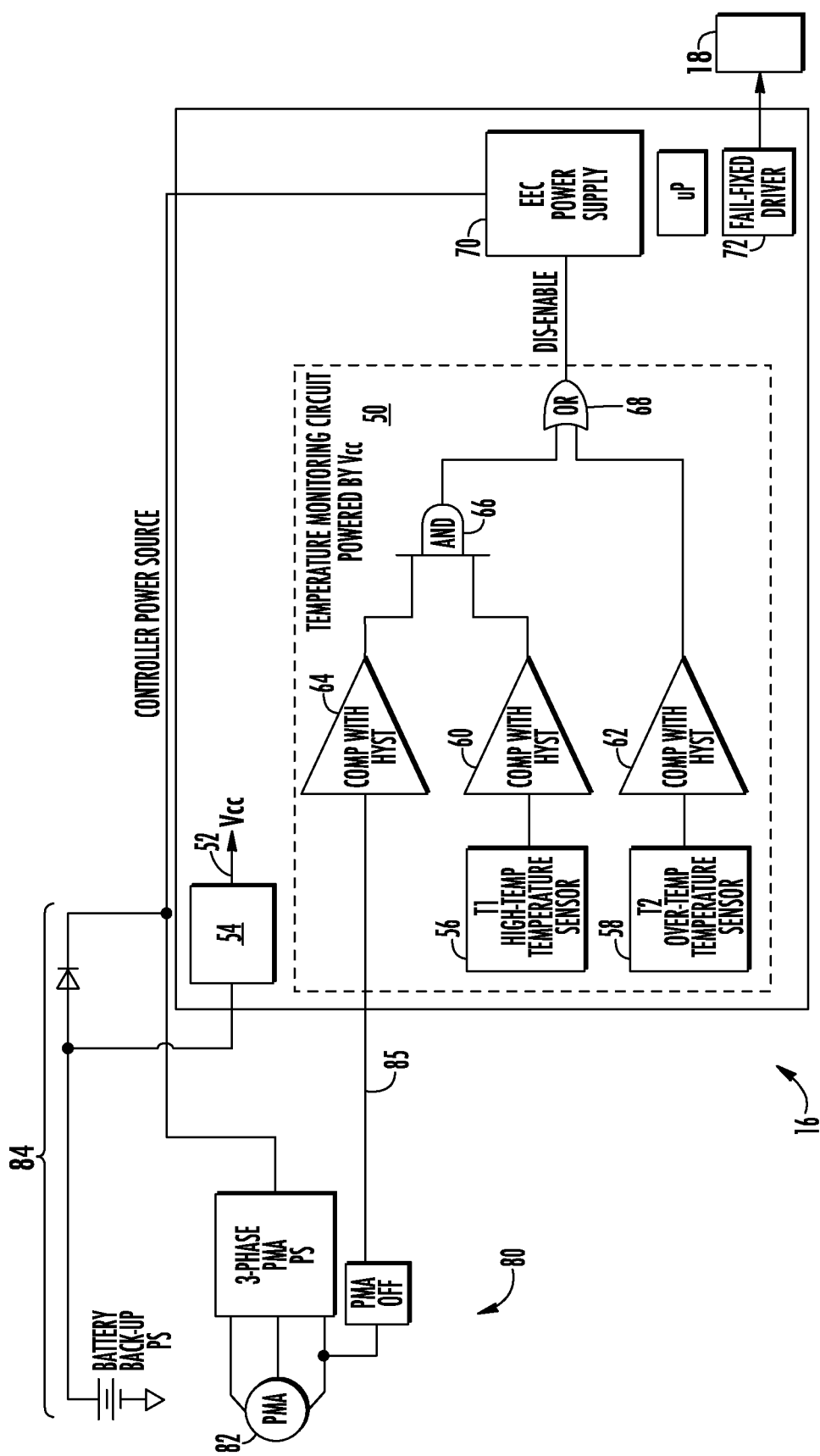
FIG. 2 depicts a partial diagram of a temperature control system and function in accordance with an embodiment.

With reference to FIG. 2 as well, a block diagram of an aircraft power system for an electronic control unit (ECU) 16 is depicted with temperature monitoring and power enable circuit(s) 50 in accordance with an embodiment. In an embodiment, the ECU 16 is typically powered from one or more power sources 80 including, but not limited to from a permanent magnet alternator (PMA) 82 and a battery voltage source 84 for redundancy. The main power source of the ECU is from a 3-phase PMA 82 configured to provide three phase AC power. When the engine 14 is operating, the PMA 82 is driven by the engine 14, (through a gear train as needed) and is spinning, supplying power. In addition, the engine 14 by virtue of its operation provides air cooling (or in some instances another form of active cooling) to the ECU 16. The battery voltage source 84 supplies DC power and is typically used for engine starting and as backup power for the ECU 16.

When the engine is shut off the temperature of the engine environment ambient to ECU 16 can increase significantly due to the residual heating of the engine 14 and the elimination of cooling air. Moreover, the heating can be exacerbated when the outdoor ambient air temperature is high (e.g., during a hot, tropical day). This condition is known as a "soak back condition". Unfortunately, this is a recurring condition that can degrade ECU 16 life due to repeated operation up to and marginally exceeding component thermal limits. Soak-back thermal values peak after engine shutdown, then decay with time. Engine re-start may occur before full soak-back thermal values dissipate. The monitoring and power enable circuit 50 will monitor for detection permanent magnet alternator 82 power indicating engine re-start. Providing ECU 16 is below $2^{nd}$ high thermal limit, full electrical power restoration is asserted to allow engine start. Furthermore, under particular failure conditions while engine operational, resulting in a loss of cooling loss or engine fire, the ECU temperatures can increase very significantly, and often quite quickly. Of course, it is highly desirable to keep the ECU 16 safe from damaging temperatures. In addition, it is also desirable to keep the ECU 16 in a safe condition. At extreme temperatures, the ECU 16 may also exhibit erratic function, resulting in erratic or improper operation of the engine 14.

Continuing with FIG. 2, in an embodiment, a small secondary DC power supply 52 is established also denoted Vcc. In an embodiment, a simple 3-terminal regulator 54 may be employed that takes the power from the battery 84 and generates the secondary power source 52 (e.g., Vcc) in the ECU 16. The secondary power source 52 is employed to provide a low voltage, low power (e.g., less than 10 mA of electrical current) excitation to a temperature monitoring and power enable circuit 50. The temperature monitoring and power enable circuit 50 may include two circuit board mounted temperature sensors 56 and 58 mounted on a circuit board (not shown) of the temperature monitoring and power enable circuit 50. The temperature sensors 56 and 58 are employed to measure the temperature in the environment of the ECU 16 and establish to threshold limits for the operation of the temperature monitoring and power enable circuit 50. The two temperature sensors 56 and 58 are mounted in close proximity to expected high temperature components or sections the ECU 16. Two temperature thresholds T1 and T2 are implemented using two different voltage comparators with hysteresis feedback 60 and 62 respectively. In the first instance a first temperature threshold is established based on temperatures measured by the temperature sensors 56, and 58 and the high temperature operating point of the components in the ECU. In an embodiment, the first threshold is established at the lowest high temperature operating point for the components in the ECU. For example, the first temperature threshold is established at the point the electronic components of the ECU 16 are approaching but have not reached their operating temperature limits, typically around 105° C. That is, the first threshold is established at a temperature below the lowest high temperature operating point for the components in the ECU. For example, in an embodiment, the first temperature threshold is established could be in the range of about 105° C. to 115° C. including any temperature in between depending on the specified operation temperature limits for the components employed in the ECU 16. In the second instance a second temperature threshold T2 is established based on the maximum temperature operating point of the components in the ECU, typically around 125° C. In an embodiment, the temperature threshold could be in the range of around 115° C. to 125° C., including any temperature in between, depending on the specified operational temperature limits for the components employed in the ECU 16.

In an embodiment, the output of comparator 60 is configured to change state when the temperature threshold T1 has been exceeded. Likewise, in an embodiment, the output of comparator 62 is configured to change state when the temperature threshold T2 has been exceeded. Hysteresis is employed, as is conventionally known, to prevent the output of the comparator 60, 62 from changing state after the threshold has been reached and oscillations about the trip point of the comparator 60, 62. In an embodiment, the first threshold denoted T1 is set based on a hot condition that would be encountered when the PMA 82 (and engine 14) is shut off, and therefore, no cooling is available. The comparator 64 receives a signal 85 from the PMA 82 indicating the operation status of the PMA 82. In an embodiment the signal 85 from the PMA 82 may employ a known rectifier circuit connected to one or more phases of the PMA to generate a voltage level signal provided as input into a comparator stage 64 that indicates if the PMA 82 is operating. As described above, the hysteresis is employed to avoid undesirable oscillations. Decision logic 66 implementing an "AND" function is employed to determine if the PMA 82 is inoperative and the first temperature threshold T1 has been exceeded. However, any implementation of the logic 66 may be employed. If the PMA 82 is off and the temperature of as measured by the first temperature sensor 56 has exceeded the first temperature threshold T1, the "AND" gate output will shut off the main power supply to the ECU 16 via "OR" gate function 68 as depicted. In an embodiment, the decision logic 66 and the "OR" function 68 may be implemented using standard low power CMOS type AND, OR logic device(s) powered by Vcc on the temperature monitoring and power enable circuit 50. With the ECU power supply turned off, the unpowered electronics employed in the ECU 16 are allowed to rise in temperature go to component storage temperatures. If the PMA 82 is subsequently enabled and cooling air returns, even while the first temperature threshold is exceeded, then the logic 66 changes state and the main power supply will be allowed to turn on.

In an embodiment The T2 sensor threshold is set to a higher temperature for the components of the ECU 16. If this temperature threshold is exceeded during engine operation, regardless of status of the PMA 82 and cooling air being available, comparator 62 will change state, and send a signal to the "OR" gate 68 and thereby the ECU power will be disabled. This is necessary to prevent the electronic components of the ECU 16 from being damaged and operational performance being degraded. In this case, the logic OR gate 68 will disable the ECU main power supply 70. In the operation of this autonomous protection circuit, the ECU power will be restored if temperature as measured by the second temperature sensor 58 returns to a safe operating temperature, that is, below the second temperature threshold T2. When the ECU 16 is disabled, commands to the actuator 18 are disabled a as the actuator driver 72 is disabled and the actuator 18 remains in at fail fixed position, or in the case when a non-electronic backup is used, the backup takes control.

It should be appreciated that in operation, the components utilized to implement the monitoring and power enable circuit 50 including the regulator 54 for the Vcc power supply 52, board mounted temperature sensors 56, 58, comparators 60, 62, and 64 as well as the logic gates 66 and 68 are designed and selected to ensure operation above the T1 and T2 temperature thresholds. For example, in one embodiment, the first and second temperature sensors are selected as SMT or thru-hole devices that are made to solder onto the circuit board with higher temperature capability. The outputs of the temperature sensors may be configured as a voltage that is proportional to the circuit board temperature and components in the vicinity.

Figure 3:
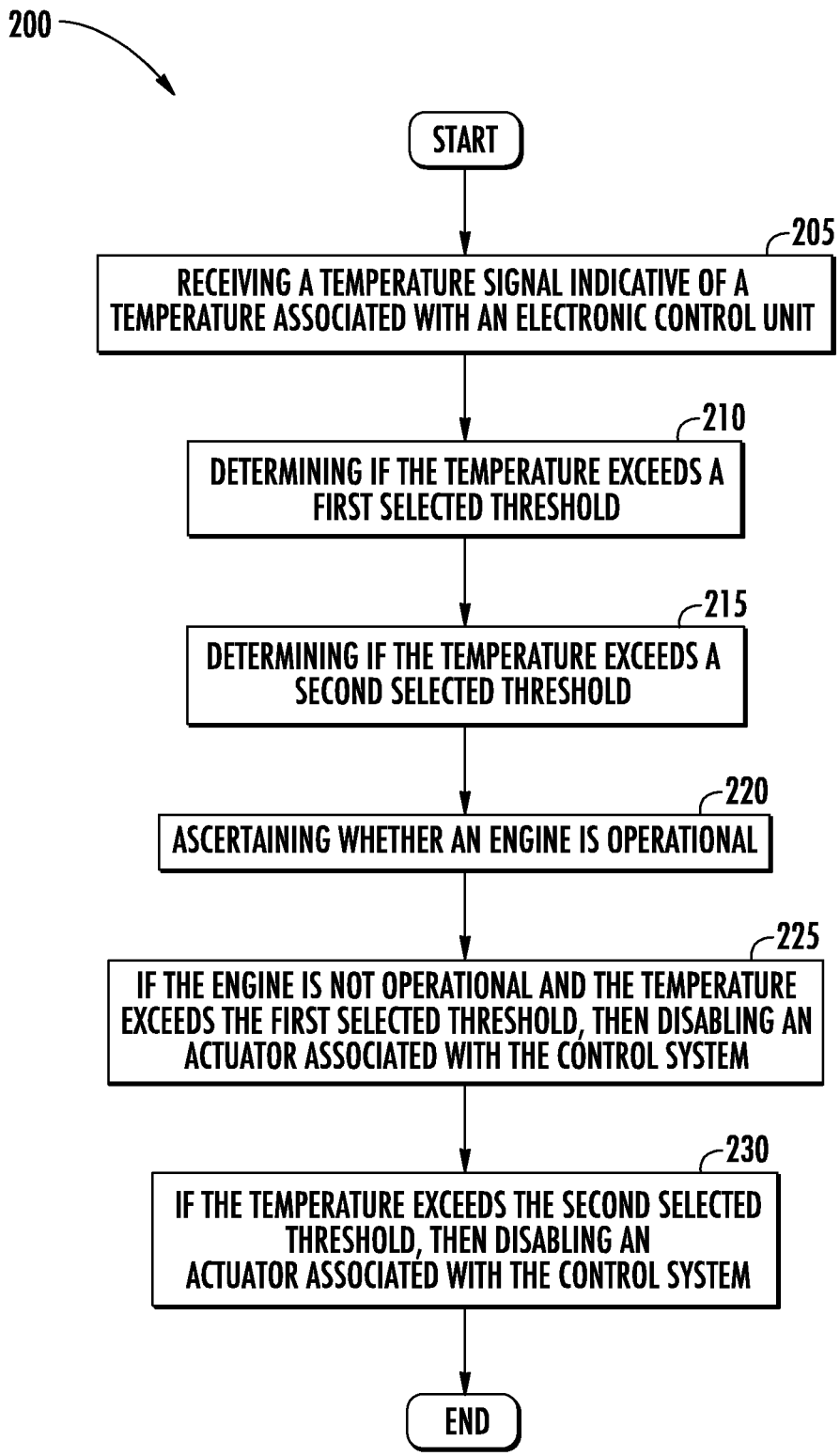
FIG. 3 depicts a simplified flowchart depicting the method of managing over-temperature excursions in an engine control unit in accordance with an embodiment.

FIG. 3 depicts a flowchart of a method 200 of managing over-temperature excursions in an electronic control unit of a control system having failed-fixed capability in accordance with an embodiment. The description on FIG. 3 will refer, from time to time, to elements in FIGS. 1 and 2. Turning to the method 500 the control system includes an operationally independent temperature monitoring and power enable function. The method 200 initiates at process block 205 with receiving a temperature signal indicative of a temperature associated with an electronic control unit. At process step 210 the method 200 continues with determining if the temperature associated with the electronic control unit exceeds a first selected threshold. Furthermore, the method 200 also includes determining if the temperature associated with the electronic control unit exceeds a second selected threshold as depicted at process 215. At process step 220, the method 200 includes ascertaining if the engine is operational. In an embodiment, as the cooling is based on the engine operation, which is indicated by the operation of the PMA 82. Monitoring of the PMA 82 is employed. In other embodiments, with separately power cooling systems, it may be advantageous to monitor the operation of the cooling system directly as well. Based on the above steps, the method at process step 225 also includes disabling an actuator associated with the control system if the engine is not operational and the temperature exceeds the first selected threshold. It should be noted that in operation it may be more important to operate regardless of the high temperatures experienced, e.g., exceeding the first threshold if the engine is still operating. For example, following a shut down after a heat soak, and the engines are restarted. Under such condition operating the engine may be more important than preserving the reliability of the electron control unit. Finally, at process step 230, the method 200 also includes disabling an actuator associated with the control system if the temperature associated with the electronic control unit exceeds the second selected threshold.

While the apparatus and methods of the subject disclosure have been shown and described with reference to described embodiments, those skilled in the art will readily appreciate that changes and/or modifications may be made thereto without departing from the scope of the subject disclosure, the claims which follow, or that in an application that claims the benefit of this application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof. For the purposes of this disclosure, it is further understood that the terms "inboard" and "outboard" can be used interchangeably, unless context dictates otherwise.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of managing over-temperature excursions in an electronic control unit of a control system having failed-fixed capability and an operationally independent temperature monitoring and power enable device, the method comprising:
   receiving a temperature signal indicative of a temperature associated with an electronic control unit;
   determining if the temperature associated with the electronic control unit exceeds a first selected threshold;
   determining if the temperature associated with the electronic control unit exceeds a second selected threshold;
   ascertaining if an engine associated with the control system is operational;
   disabling a command to an actuator associated with the control system if the engine is not operational and the temperature exceeds the first selected threshold; and
   disabling a command to the actuator associated with the control system, if the temperature associated with the electronic control unit exceeds the second selected threshold;
   wherein the first selected threshold corresponds to a temperature of the electronic control unit below a maximum operating temperature; and
   wherein the first selected threshold is in the range of about 105° C. to 115° C.

2. The method of managing over-temperature excursions as recited in claim 1, further including establishing a power source for the temperature monitoring and power enable device independent of a power source for the electronic control unit.

3. The method of managing over-temperature excursions as recited in claim 2, wherein the power source is a regulator.

4. The method of managing over-temperature excursions as recited in claim 1, further including receiving another temperature signal indicative of another temperature associated with the electronic control unit.

5. The method of managing over-temperature excursions as recited in claim 1, wherein the second selected threshold is determined based on another temperature signal.

6. The method of managing over-temperature excursions as recited in claim 1, wherein the second selected threshold corresponds to a maximum operating temperature of a component of the electronic control unit.

7. The method of managing over-temperature excursions as recited in claim 1, wherein an operating temperature of components associated with the temperature control function exceeds a maximum operating temperature of the electronic control unit.

8. A method of managing over-temperature excursions in an electronic control unit of a control system having failed-fixed capability and an operationally independent temperature monitoring and power enable device, the method comprising:
   receiving a temperature signal indicative of a temperature associated with an electronic control unit; determining if the temperature associated with the electronic control unit exceeds a first selected threshold;
   determining if the temperature associated with the electronic control unit exceeds a second selected threshold;
   ascertaining if an engine associated with the control system is operational;
   disabling a command to an actuator associated with the control system if the engine is not operational and the temperature exceeds the first selected threshold; and
   disabling a command to the actuator associated with the control system, if the temperature associated with the electronic control unit exceeds the second selected threshold;
   wherein the second selected threshold is about 115° C. to 125° C.

9. A system for managing over-temperature excursions in an electronic control unit of a control system having failed-fixed capability, the system comprising:
   an electronic control unit associated with the control system, the electronic control unit operable to control a failed-fixed actuator;
   a temperature sensor configured to provide a temperature signal indicative of a temperature associated with an electronic control unit;
   a temperature monitoring and power enable device, operably connected to the electronic control unit, the temperature monitoring and power enable device configured to disable the fail-fixed actuator command to an actuator associated with the control system under selected conditions; and
   wherein the temperature monitoring and power enable device is configured to:
   receive the signal indicative of a temperature associated with an electronic control unit;
   determine if the temperature associated with the electronic control unit exceeds a first selected threshold;
   determine if the temperature associated with the electronic control unit exceeds a second selected threshold;
   ascertain if an engine associated with the system is operational;
   disable a command to an actuator associated with the control system if the engine is not operational and the temperature exceeds the first selected threshold; and
   disable a command to the actuator associated with the control system, if the temperature associated with the electronic control unit exceeds the second selected threshold;
   wherein the second selected threshold is in a range of about 115° C. to 125° C.

10. The system for managing over-temperature excursions as recited in claim 9, further including another temperature sensor, the temperature sensor providing another temperature signal indicative of another temperature associated with the electronic control unit.

11. The system for managing over-temperature excursions as recited in claim 10, wherein the temperature monitoring and power enable device is further configured to determine if the another temperature associated with the electronic control unit exceeds the second threshold based on the another temperature signal.

12. The system for managing over-temperature excursions as recited in claim 9, wherein the temperature monitoring and power enable device includes a power source for the temperature monitoring and power enable function independent of a power source for the electronic control unit.

13. The system for managing over-temperature excursions as recited in claim 9, wherein the first selected threshold corresponds to a temperature of the electronic control unit below a maximum operating temperature.

14. The system for managing over-temperature excursions as recited in claim 13, wherein the first selected threshold is in a range of about 105° C. to 115° C.

15. The system for managing over-temperature excursions as recited in claim 9, wherein the second selected threshold corresponds to a maximum operating temperature of a component of the electronic control unit.

16. The system for managing over-temperature excursions as recited in claim 9, wherein an operating temperature of components associated with the temperature control device exceeds the maximum operating temperature of the electronic control unit.

\* \* \* \* \*